A. P. KLEE.
BOTTLE FILLING AND MEASURING MACHINE.
APPLICATION FILED FEB. 24, 1915.

1,171,792.

Patented Feb. 15, 1916.
2 SHEETS—SHEET 1.

WITNESSES:
L. B. Woerner.
Wm Hurte

INVENTOR
Alfred P. Klee,
By Minturn Hoerner,
ATTORNEYS.

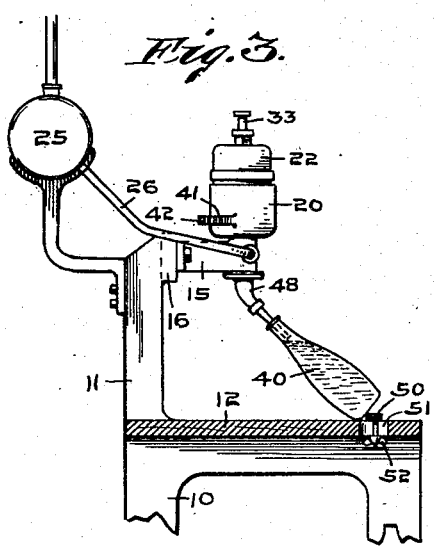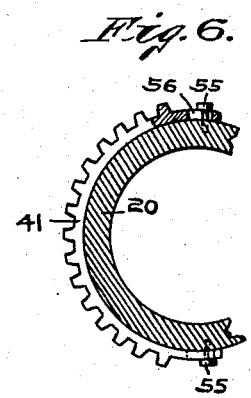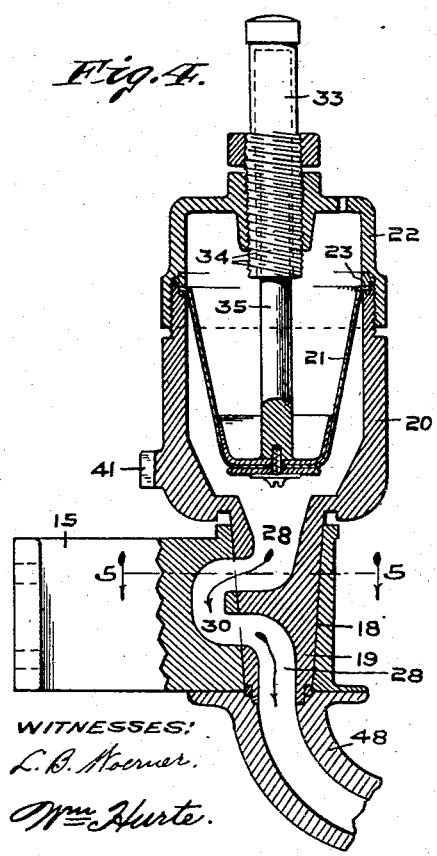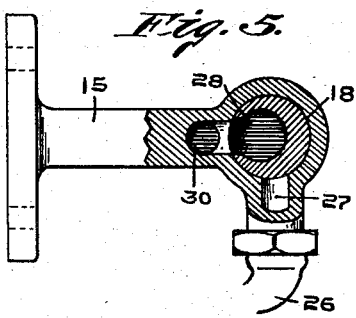

UNITED STATES PATENT OFFICE.

ALFRED P. KLEE, OF INDIANAPOLIS, INDIANA.

BOTTLE FILLING AND MEASURING MACHINE.

1,171,792. Specification of Letters Patent. Patented Feb. 15, 1916.

Application filed February 24, 1915. Serial No. 10,217.

*To all whom it may concern:*

Be it known that I, ALFRED P. KLEE, a citizen of the United States, residing at Indianapolis, in the county of Marion and State of Indiana, have invented certain new and useful Improvements in Bottle Filling and Measuring Machines, of which the following is a specification.

This invention relates to a machine for uniformly measuring certain quantities of non-carbohydrous liquids and for introducing said measured quantities of liquids into bottles.

The object of the invention is to provide a machine whereby a plurality of separate quantities of non-carbohydrous liquids can be measured and introduced into a plurality of bottles, so that the operation of filling bottles with the above liquids can be economically and expeditiously performed.

A further object of the invention is to provide a machine embodying a series of simultaneously operable liquid measuring and bottle filling devices arranged to permit a part of said series of devices to fill with liquid while the remaining part of said devices are discharging their contents into bottles in an alternate manner.

I accomplish the objects of the invention by means of the construction shown in the accompanying drawings, forming a part hereof, in which—

Figure 1:
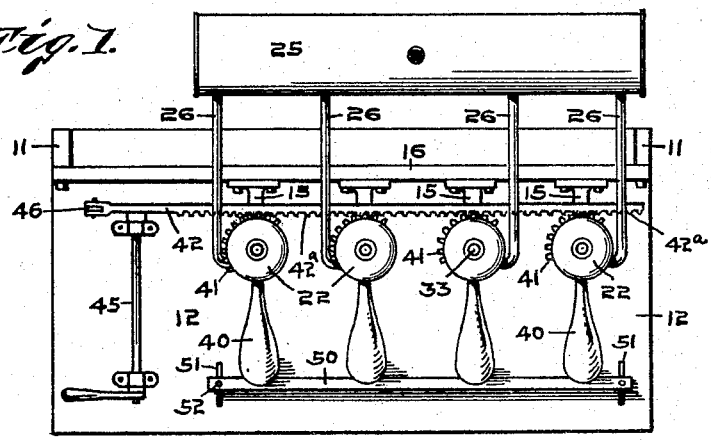
Figure 2:
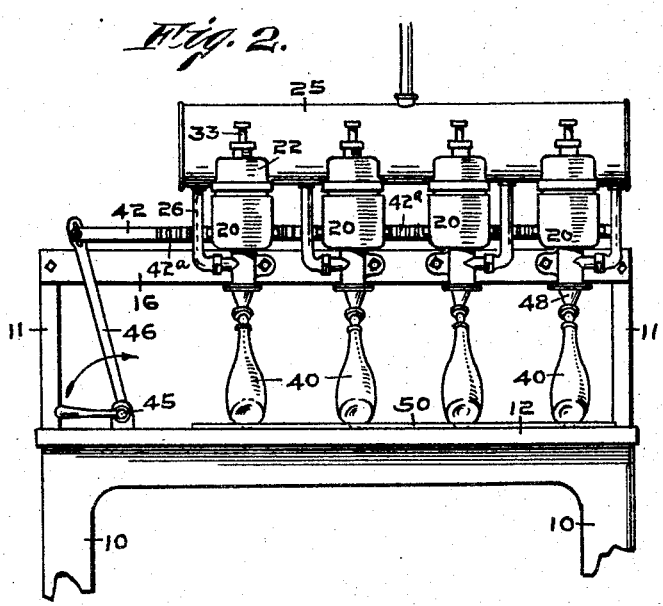

Figure 1 is a top or plan view of a machine embodying my invention. Fig. 2 is a front elevation of the construction shown in Fig. 1. Fig. 3 is a cross section of the construction shown in Fig. 1. Fig. 4 is a central vertical section, on an enlarged scale, of one of the measuring devices. Fig. 5 is a cross section on the line 5—5 in Fig. 4. Fig. 6 is a fragmentary detail in section of a modified form, showing the rack formed independently of the filling device.

Referring to the drawings, the filling and measuring machine consists of a suitable frame 10 for mounting the measuring and filling devices, and also for supporting the bottles. Standards 11 extend vertically from the rear of the table-top 12 of the frame 10, the said standards forming a support for the measuring and filling devices.

The machine is usually provided with four measuring and filling devices for the reason that said number can be conveniently attended to by one person, the two hands being employed in placing two bottles into and for removing two bottles from the machine.

The measuring devices are independently supported by means of the brackets 15 which are secured to the horizontal member 16 secured to the vertical standards 11, and the forward portions of the brackets 15 form the outer members of the valve for controlling the inflow and outflow of the liquid into and out of the measuring devices. The outer ends of the brackets 15 are provided with a vertically disposed cone shaped aperture 18 adapted to receive the tapering spigots 19 which are formed integrally with the bowls 20 of measuring devices. Arranged within the hollow chambers of the bowls 20 are the diaphragms 21 clampingly held in position by means of the caps 22 and clamping-rings 23. The liquid is delivered by gravity to the measuring devices from a distributing tank 25 through the lead pipes 26 which communicate with the cone shaped openings 18 through the lateral openings 27, and when the openings 28 in the spigots 19 register with the lateral openings 27 the liquid will pass upward through the spigots and through the by-passes 30 in the brackets 15 and thence back through the upper portions of the openings 28 and into the hollow chambers beneath the diaphragms 21, forcing the latter upward until sufficient liquid has been introduced into the hollow chambers to subsequently enable the desired amount of liquid to be introduced into the bottles. To insure a uniform amount of liquid to be introduced into each bottle in successive order, which is regulated by the amount of displacement of the diaphragms 21 from their normal positions, the displacement or travel of said diaphragms is controlled by means of hollow cylinders 33 carrying the exterior threads 34 and being subject to vertical adjustment through the caps 22. The diaphragms 21 are provided with the vertically disposed stems 35 which project into the hollow portions of the cylinders 33, the latter forming guideways for said diaphragms and for retaining said diaphragms centrally within the bowls 20.

The four measuring devices shown in the drawings are arranged or divided into two groups, and all of the devices are rocked back and forth simultaneously by means of a rack-bar 42. When the rack-bar 42 has been moved to the limit of its travel in one direction, the position of the devices is such as to bring the openings 28 in the spigots 19 in one group into registration with the inlet openings 27, while the openings 28 in the spigots in the other group are brought into registration with the by-passes 30, and vice versa, when the rack-bar 42 is moved to the limit of its travel in the opposite direction.

As heretofore stated, the measuring devices are susceptible of being oscillated simultaneously by means of the rack-bar 42 which is provided with the teeth 42ª which mesh with the racks 41 formed upon the exterior surfaces of the bowls 20. The rack-bar 42 is rocked back and forth by means of a rock-shaft 45 and a lever 46, the latter connecting the rack-bar 42 and rock-shaft 45.

Liquid in passing out of the measuring devices through the spigots 19 enters the nozzles 48 which project into the necks of the bottles being filled. The bottles 40 during the operation of filling are temporarily supported by means of the table top 12 and assume an incline position, as shown in Fig. 3, which position enables the bottles to be more readily inserted and removed from the machine than were possible in case the bottles were moved into a vertical position. A brace-bar 50 is adjustably mounted upon the table top 12 and may be moved so as to abut the ends of the bottles and prevent their accidental displacement while the bottles are being filled with liquid. The adjustability of the bar 50, by means of the slots 51 in the table top 12 and bolts 52, enables the bar to be moved toward or away from the nozzles 48 to enable the machine to accommodate bottles of different lengths and capacities.

Fig. 6 is a view illustrating a modified form of one of the racks 41. In this instance the rack is formed independently of the bowl 20 and is held in position upon said bowl body by means of the bolts 55. These bolts pass through elongated slots 56 to enable the rack to be adjusted circumferentially around the body of the bowl so that the travel of said bowl may be regulated for insuring the registration of the opening 28 in the spigot 19 with the liquid opening inlet 27 and outlet 30.

While I have described my said invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

Having thus fully described my said invention, what I desire to secure by Letters Patent, is—

1. In a machine of the above class, the combination of a plurality of liquid measuring devices, means for regulating the flow of liquid into and out of said devices, engaging-means arranged upon the exterior surfaces of said devices, and a single operating means for engaging the engaging-means for simultaneously imparting oscillatory movement to said devices for bringing the latter into positions for the filling of a part of said devices and the discharging of the contents of the remaining devices.

2. In a machine of the above class, the combination of a plurality of liquid measuring devices, means for regulating the flow of liquid into and out of said devices, segmental racks arranged circumferentially upon the exterior surfaces of said devices, and a single rack-bar engaging the several segmental racks for simultaneously imparting oscillatory movement to said devices and causing a part of the latter to discharge their contents and the remaining devices to be charged with liquid.

3. In a machine of the above class, the combination of a plurality of liquid measuring devices, means for regulating the flow of liquid into and out of said devices, means for varying the quantity of liquid introduced into said devices, segmental racks arranged circumferentially upon the exterior surfaces of said devices, and a single rack-bar engaging the several segmental racks for simultaneously imparting oscillatory movement to said devices, causing a part of the latter to be brought to a point for the discharge of their contents and the remaining devices to be charged with liquid.

4. In a machine of the above class, the combination of a plurality of liquid measuring devices, means for regulating the flow of liquid into and out of said devices, means for simultaneously moving said devices to bring a part of said devices to a point for discharging their contents and the remaining devices to a point to be charged with liquid, and means for adjusting said devices independently of said last mentioned means for maintaining accurate registration of said devices with the points of charging and discharging of their contents.

In witness whereof, I have hereunto set my hand and seal at Indianapolis, Indiana, this 19th day of February, A. D. one thousand nine hundred and fifteen.

ALFRED P. KLEE. [L. S.]

Witnesses:
F. W. WOERNER,
J. A. MINTURN.